J. BANKS.
Cultivator.
No. 19,742.
Patented Mar. 30, 1858.
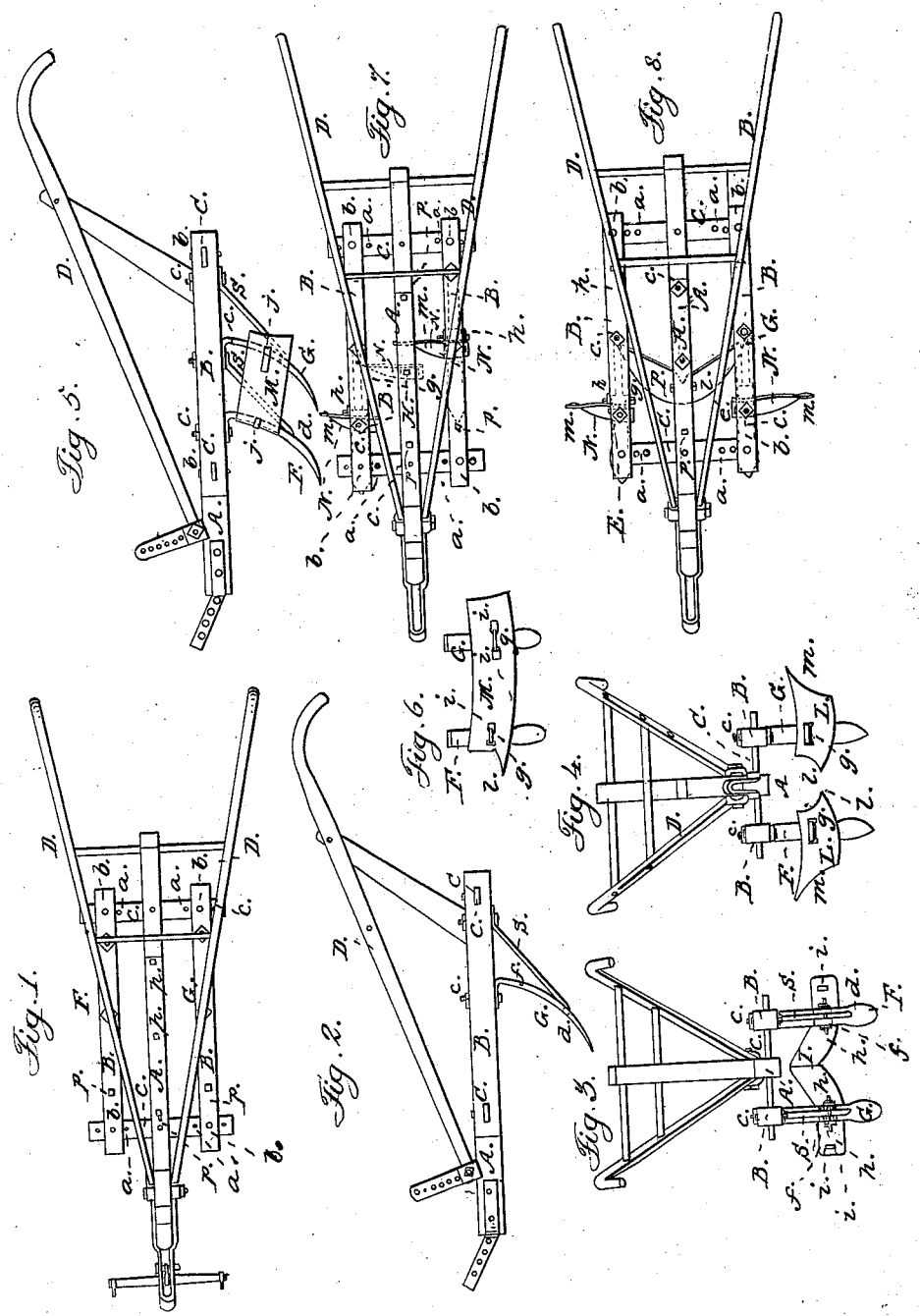

UNITED STATES PATENT OFFICE.

JOSEPH BANKS, OF DADEVILLE, ALABAMA.

IMPROVEMENT IN CULTIVATORS.

Specification forming part of Letters Patent No. 19,742, dated March 30, 1858.

*To all whom it may concern:*

Be it known that I, JOSEPH BANKS, of Dadeville, in the county of Tallapoosa and State of Alabama, have invented a new and Improved Corn and Cotton Coverer and Cultivator; and I do hereby declare that the following is a full and exact description thereof, reference being had to the accompanying drawings, making part of this specification—

Figure 1 being a plan of the implement arranged for covering corn and cotton; Fig. 2, a side elevation of the same; Fig. 3, a rear elevation of the implement arranged for removing the "crust" or baked surface of the soil from the drills before the young plants come up; Fig. 4, a front elevation of the implement arranged for the first cultivation; Fig. 5, a side elevation thereof, with a modified arrangement for the same purpose; Fig. 6, a view of a detached part in the same arrangement; Fig. 7, a plan of the implement arranged for the second working in the cultivation; Fig. 8, a plan of the implement arranged for the third or last working.

Like letters designate corresponding parts in all the figures.

The frame or body of the implement is composed principally of a central beam, A, two parallel side beams, B B, two cross bars or timbers, C C, and handles D D. There is a set of holes, a a, in each of the cross-bars C C, whereby the side beams, B B, are adjusted to different distances from the central beam, A, and secured in their positions by bolts b b. A set of mortises, p p p, is made vertically through the beams A B B at regular and corresponding distances apart, for the reception of bolts c c c, which secure the teeth F G H and their braces S S to the under sides of said beams. Teeth F G are employed both to work the earth and for receiving the several scrapers. They are attached to and arranged so as to be shifted to different positions beneath the under sides of the side beams, B B, and each has a rear brace, S, bolted to the beam at the top, while the lower end thereof is pointed and enters a shallow hole or notch, d, in the back of the tooth, all substantially as shown in Figs. 1 and 2.

In the arrangement represented in Fig. 3 for scraping off the crust from the surface of the soil when it becomes baked, as it frequently does, so that the young plants are prevented from coming up, the parts of the implement above described are situated precisely as represented in Figs. 1 and 2. To the front of the teeth is then secured a scraper, I, substantially of the form shown, the lower edge being sharp and notched in the middle, as shown at n, for the purpose of leaving the earth in a ridge where the young plants are to grow up. The mode of attaching this scraper and all the other scrapers herein to be described to the teeth, and of adjusting them thereon, is by means of staples g g, passing through holes i i in the scraper and embracing the sides of the tooth, and then driving a key, h, through holes in the staple behind the tooth, thus securing the whole. There are transverse notches f in the back of each tooth, into some of which the key h enters and prevents any vertical sliding of the scraper. There is a set of several holes, i i, in some of the scrapers, to allow them to be attached to the teeth F G when at different distances apart.

For the first working of the soil between the drills or rows, when it is desired to stride each drill with the implement, the teeth F G are arranged as above specified; and instead of the scraper I, as in Fig. 3, two scrapers, L L, right and left, are attached respectively to the teeth, as represented in Fig. 4. Their under edges terminate in points l l at the inner ends, in order to stir the earth beneath the surface as close to the plants as it is safe to cultivate. The outer ends are curved, substantially as shown at m m, for the purpose of turning the soil outwardly or away from the drills.

When it is desired to cultivate only one side of the drill or row at a time one tooth, F, is moved forward under its beam, and a single scraper, M, of the form shown in Fig. 6, is attached obliquely, as represented in Fig. 5. There is a projecting point, l, on the advanced end for stirring the soil close to the plants, while the earth is thrown aside at the other end of the scraper into the middle space between the rows.

For the second working the teeth F G are arranged as in Fig. 5—that is, one being more advanced than the other. Scrapers N N are then attached to the teeth, the ends m m thereof pointing in the same direction, so that each may throw the soil toward the plants, and thus commence the hilling. A third scraper, of the same form, may be placed in a row between the other two, beneath the central beam, A, as indicated by red lines in the figure, for the purpose of increasing the amount of hilling.

For the third working, or any subsequent working which may be made, the implement is arranged as represented in Fig. 8. The two side teeth, F G, are arranged transversely opposite to each other in the foremost position beneath the beams, and to these right and left scrapers N N are secured. Farther back a third tooth, H, is secured to the middle beam, A, and a central scraper or point, P, having double wings, as shown, is attached to said tooth. The implement, when thus arranged, passes centrally between the rows, the first scraper, P, throwing the earth from the middle both ways toward the rows, while the outer scrapers, N N, complete the hilling both ways to the rows.

What I claim as my invention, and desire to secure by Letters Patent, is—

The construction, arrangement, and combination of the body of the implement and its movable teeth, as herein described, whereby it is readily adapted to properly receive in turn the several scrapers employed for performing the various modes of cultivation specified.

JOSEPH BANKS.

Witnesses:
R. F. OSGOOD,
J. S. BROWN.